Dec. 27, 1955  A. G. STIMSON ET AL  2,728,265
PHOTOELECTRIC MEASURING INSTRUMENT
Filed May 7, 1952  3 Sheets—Sheet 1
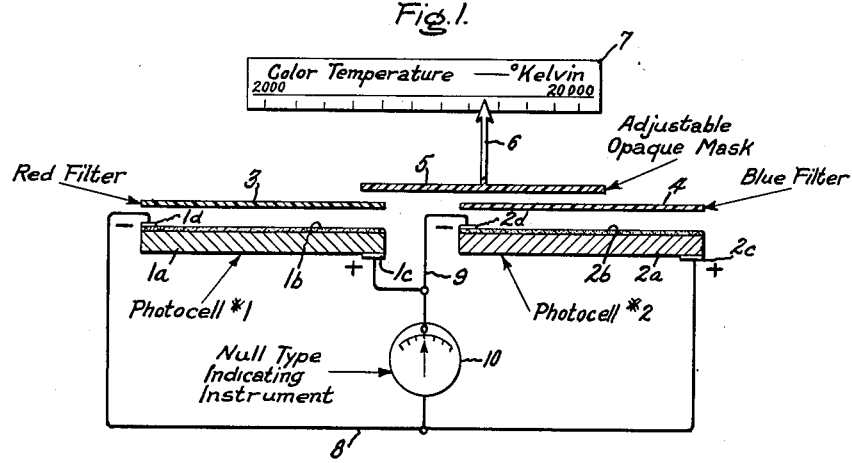
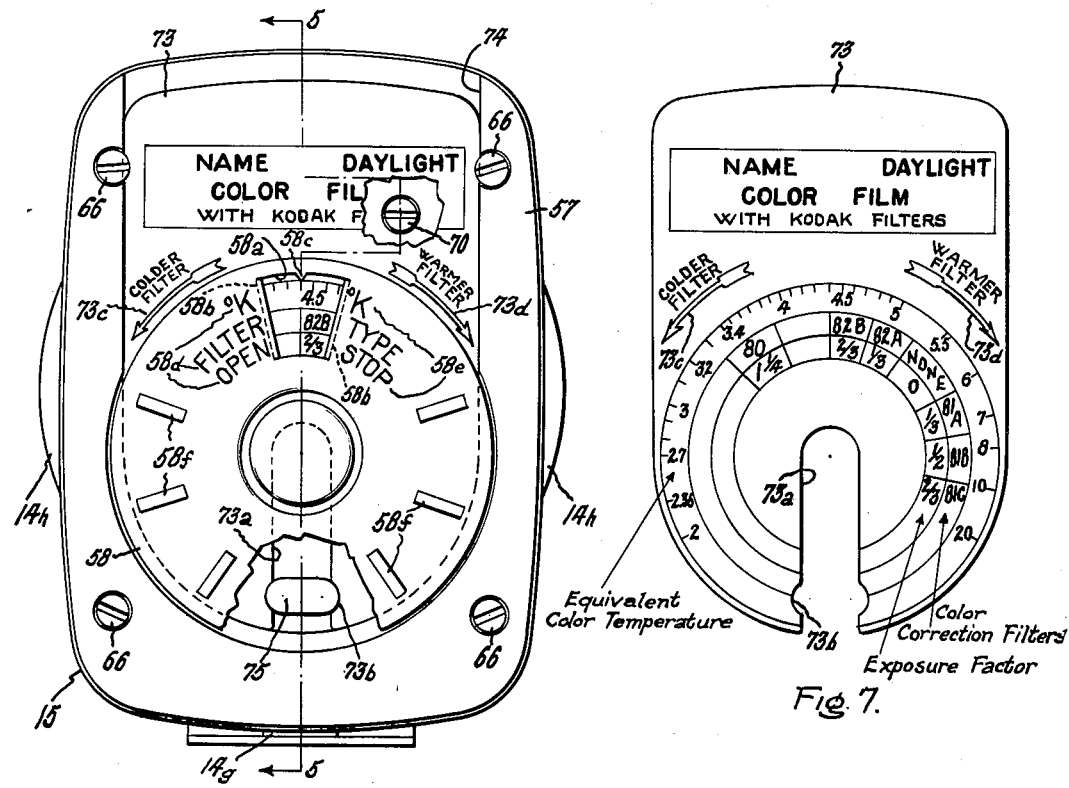
Inventors:
Allen G. Stimson;
Clement F. Taylor;
Hans A. Bakke,
by Richard E. Healey
Their Attorney.

Dec. 27, 1955   A. G. STIMSON ET AL   2,728,265
PHOTOELECTRIC MEASURING INSTRUMENT
Filed May 7, 1952   3 Sheets-Sheet 2
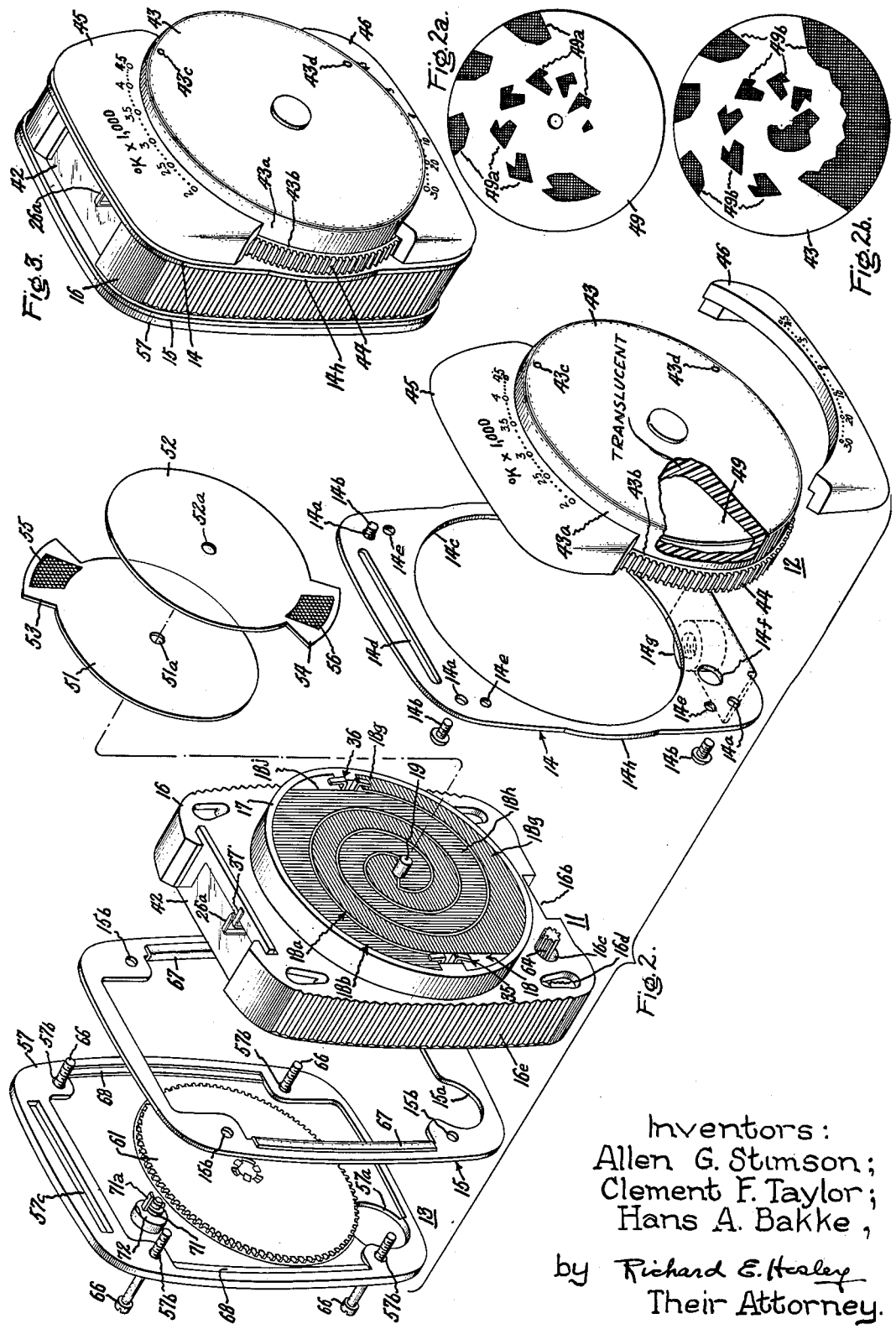
Inventors:
Allen G. Stimson;
Clement F. Taylor;
Hans A. Bakke,
by Richard E. Healey
Their Attorney.

Dec. 27, 1955 A. G. STIMSON ET AL 2,728,265
PHOTOELECTRIC MEASURING INSTRUMENT
Filed May 7, 1952 3 Sheets-Sheet 3
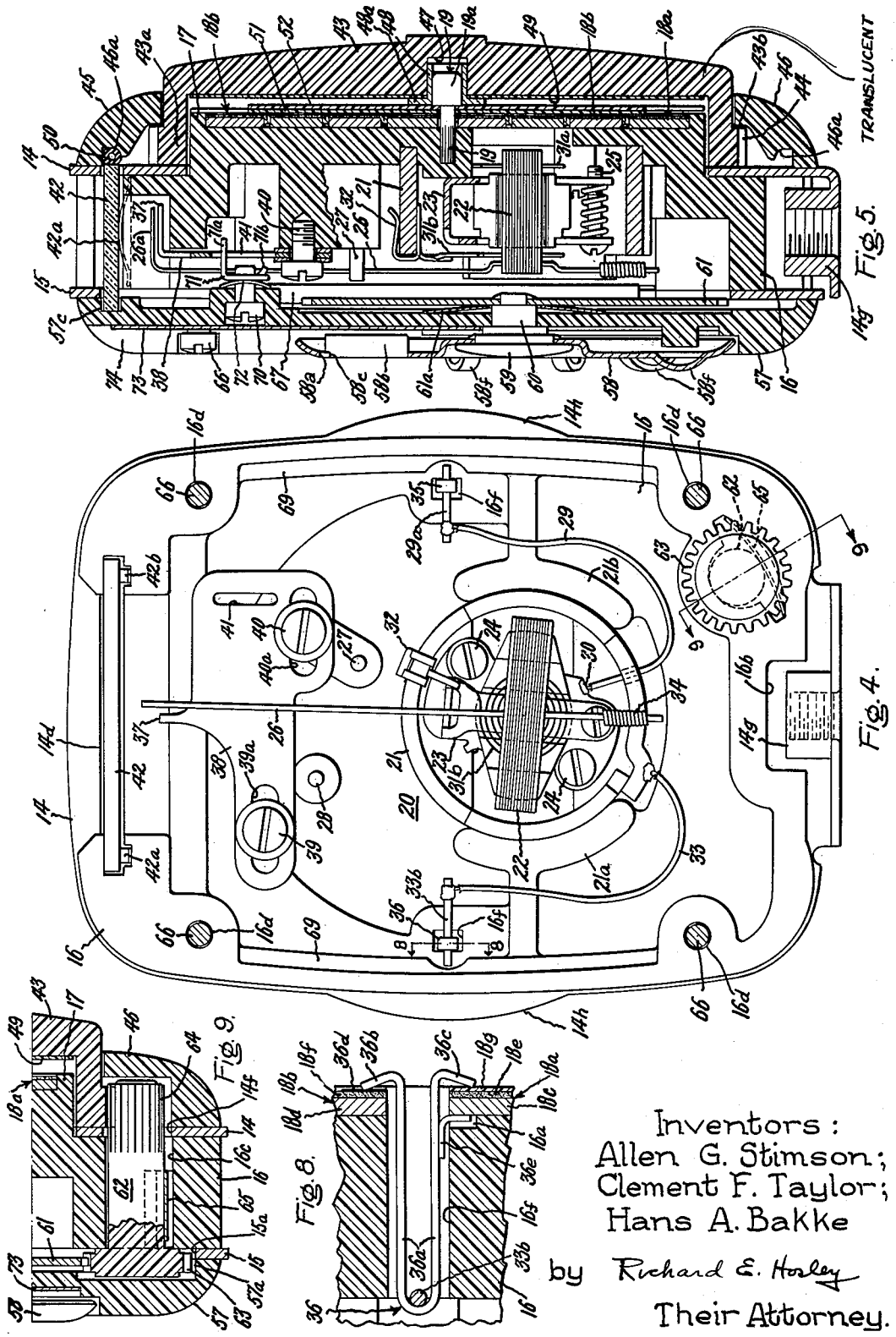
Inventors:
Allen G. Stimson;
Clement F. Taylor;
Hans A. Bakke
by Richard E. Horley
Their Attorney.

United States Patent Office 2,728,265
Patented Dec. 27, 1955

2,728,265

PHOTOELECTRIC MEASURING INSTRUMENT

Allen G. Stimson, Lynnfield, Clement F. Taylor, Lynn, and Hans A. Bakke, Swampscott, Mass., assignors to General Electric Company, a corporation of New York Application May 7, 1952, Serial No. 286,494

8 Claims. (Cl. 88—22.5)

This invention relates to light-sensitive electric measuring instruments, particularly to a light meter having more than one photosensitive element arranged to measure the relation between the quantities of energy in at least two spaced portions of the spectrum. While the instrument may have many other applications, it is particularly adapted for determining the "equivalent color temperature" of illumination, as required by illuminating engineers and photographers. In the form disclosed specifically herein, the instrument is a "color control meter" intended for use by photographers to ascertain what color compensating filters must be used with a particular color film in order to obtain desired color rendition in the finished picture.

With the rapidly increasing use of numerous types of color films by professional and amateur photographers, there has arisen an urgent need for means for ascertaining the "color temperature" of the illumination, since the "latitude" of color films is comparatively small and they must therefore be manufactured so as to give normal color rendition with illumination in a comparatively small preselected range of color temperature. Generally, use of a color film with light more than about 100° Kelvin removed from the illumination for which the emulsion is balanced will result in abnormal color rendition in the picture. This becomes a serious matter to the photographer, since the color quality of natural light varies widely, from about 3,500° Kelvin shortly after sunrise, increasing to around 6500° Kelvin at noon, in summer, and dropping again towards the middle of the afternoon. Clear blue sky may give light at about 10,000° K., and blue northwest sky up to 20,000° K. For this reason the manufacturer may recommend that the photographer limit use of the film to direct sunlight and during a comparativly few hours in the middle of the day, and use a compensating color filter on overcast days, in the shade, or early and late in the day. Thus it becomes desirable for even the amateur photographer to have some instrument for ascertaining the approximate color temperature of the illumination, so he can determine whether a color compensating filter is required, as well as the precise type of filter. Color temperature measurement is of even more importance to the professional photographer using enormously expensive film and faced with the absolute necessity for getting true color rendition, or a desired deviation from "normal" rendition.

In addition to being simple to use and sufficiently inexpensive that even the amateur photographer can afford it, such an instrument must meet a number of very exacting requirements. It must produce a direct indication of "equivalent color temperature" irrespective of the intensity level of the illumination and changes in the intensity level. Particularly in outdoor photography, as when the sky is filled with broken clouds, the general intensity level may vary so rapidly as to make it impractical to use an instrument of the type in which two or more consecutive readings must be taken and then the color temperature calculated from these readings. It is also important that the measurement be independent of the direction at which the light falls on the photosensitive unit; because the average photographer cannot be expected to exercise extreme care in reading the instrument, since his principal attention must be to the picture. It goes without saying that the instrument must be easy to set, preferably having a large range of movement of the settable member for a comparatively small change in the meter reading. The instrument should also have good accuracy without requiring close manufacturing tolerances, if it is to fall in a price range which the amateur can afford. It should preferably be small and arranged for convenient operation by one hand. And finally, it should be readily adaptable for use with the enormous variety of color films and compensating filters available to the photographer.

Accordingly, the object of the present invention is to provide a simple, inexpensive, easily operated equivalent color temperature measuring instrument capable of quick, accurate and direct indications of color temperature, the reading being independent of the intensity level of the illumination and changes thereof, and independent of the direction from which light falls on the sensitive element.

Other objects and advantages will become apparent from the following description, taken in connection with the accompanying drawings, in which Fig. 1 is a diagrammatic representation of the basic components and the electrical circuit connecting them, indicating the general principle of operation, Fig. 2 is an exploded isometric view of the components of the meter, Fig. 2a and 2b are plan views of two adjustable masking elements of the assembly, Fig. 3 is an isometric view of the assembled instrument, Fig. 4 is an elevation view of the assembled instrument with the rear cover assembly and backplate removed, Fig. 5 is a full sectional view of the meter taken on plane 5—5 in Fig. 6, Fig. 6 is an elevation view of the back cover assembly showing the calculator dial, Fig. 7 illustrates one side of the removable calculator scale card, and Figs. 8 and 9 are detail sectional views, taken on the planes 8—8 and 9—9 in Fig. 4.

Generally, this color control meter comprises a pair of separate photocell units sensitive to radiation in widely spaced portions of the spectrum, in circuit with an electrical measuring instrument arranged to produce a null indication when the output of the respective cells balances. Multiple calibrating and adjusting mask means are associated with the photocells and are so connected to the indicating dial that displacement of the adjustable mask is taken as a measurement of the equivalent color temperature of the light.

This color control meter employs the multiple spiral photocell described more completely in the copending application of Clement F. Taylor, Walton E. Briggs, and John F. Weary, Serial Number 271,746, filed February 15, 1952, now U. S. Patent No. 2,668,184, and assigned to the same assignee as the present application, and the multiple calibrating and masking arrangement disclosed in the copending application of Clement F. Taylor, Serial Number 275,414, filed March 7, 1952 and assigned to the same assignee as the present application.

The general arrangement and principle of operation is illustrated diagrammatically in Fig. 1. The separate photocells are indicated at 1 and 2. Each consists of a conductive back plate member as shown at 1a, with a photo-sensitive selenium layer 1b, and suitable conductive terminal portions 1c, 1d secured to the back plate and photo-sensitive coating respectively. Cell 1 has associated therewith a red light transmitting filter 3, and cell 2 is covered by a blue filter 4. Immediately above the filters is an adjustable opaque mask 5 to which is connected an indicator pointer 6 cooperating with the color temperature scale 7. The photocell terminals are connected in series by a conductor 8 connecting negative terminal 1d with positive terminal 2c, and conductor 9 connecting negative terminal 2d with positive terminal 1c. The "null type" indicating instrument 10 is connected in series circuit with both cells so as to give a zero indication when the output of the two cells is in balance.

It will be apparent from a consideration of Fig. 1 that shifting the opaque mask 5 transversely progressively uncovers one filtered photocell and covers the other. Then, if the response characteristics of the two photocells are linear, the degree of movement of the adjustable mask is a measure of the ratio between the quantity of energy in the red portion of the spectrum relative to the quantity of energy in the blue portion of the spectrum. Thus, if the mask 5 is adjusted until the instrument 10 reads zero, the position of the mask pointer 6 will indicate the color temperature on scale 7. This general type of radiation ratio-detecting arrangement is old in the art, and we do not claim it as our invention.

The meter which comprises our invention consists of three separate sub-combinations illustrated in the exploded view of Fig. 2. The central or body component indicated generally at 11 includes the multiple photocell unit and the electrical measuring instrument, including all circuit connections therebetween. The front or dome assembly 12 includes the translucent dome member which is manually adjusted by the operator. The back or calculator dial assembly 13 carries a replaceable calculator scale card and calculator dial, which is geared to rotate with the adjustable dome. A metal intermediate plate 14 is interposed between the body 11 and dome assembly 12, and a second intermediate plate 15 is disposed between the body 11 and the back cover assembly 13. Briefly stated, the operation of the instrument is that the translucent dome is aimed at the light source and the dome manually rotated until the meter needle is at zero, after which the desired information is obtained from the calculator dial on the back of the instrument.

The structural details of the meter body proper will be appreciated from a consideration of Figs. 2, 4, and 5. The main frame member 16 is preferably a plastic molding having on the front side thereof a projecting cylindrical portion 17 defining a circular recess for receiving the multiple photocell unit shown generally at 18 (Fig. 2). As disclosed more particularly in the above-mentioned application of Taylor, Briggs and Weary, Serial Number 271,746, this multiple photocell comprises two complementary spirals 18a, 18b, covered by blue and red spiral color filters respectively. A metal center-post member 19 is secured in the plastic body 16, serving as the pivot for certain of the masking members described hereinafter as well as the translucent dome, as may be seen in Fig. 5.

As described more particularly in the above-mentioned copending application of Taylor, Briggs, and Weary, Serial Number 271,746, the multiple spiral photocell is bonded together by amorphous selenium or other plastic material filling the spiral gap between the separate photocells. The upper surface of each cell is coated with photosensitive selenium, covered by a transparent conductive layer having in contact therewith a network of low resistance collector strips arranged to provide direct access to the collector network from all parts of the photosensitive selenium surface. This collector strip network is not seen in Fig. 2 because it is covered by the red and blue color filters, and is not shown in Figs. 5 and 8 because of the comparatively small scale of these drawings, this feature being disclosed fully in the above-mentioned Taylor, Briggs and Weary application. The purpose of this collector network is to insure the requisite linearity in photocell output. The conductive metal back-plates of the respective photocells may be seen at 18c, 18d in Fig. 8, the photosensitive selenium coating at 18e, 18f in Fig. 8, and the blue and red color filters at 18g and 18h respectively in Fig. 2.

The electrical measuring instrument, shown generally at 20 in Fig. 4, is of the general type disclosed in the United States patent to C. F. Taylor et al. No. 2,509,893, issued May 30, 1950, and assigned to the same assignee as the present application. The structural details of this microammeter need not be considered in detail here, but it may be noted that the instrument comprises a flux ring 21 cemented or otherwise secured in the meter body between arcuate projections 21a, 21b, a moving coil 22 carried in suitable jewel bearing supports (not shown) having a frame member 23, which frame is adapted to be secured to the plastic body 16 by two screws 24. The fit of the coil support spindle in its bearings is adjusted by means of a screw 25 (Fig. 5). The moving coil 22 carries a needle 26 having a pointer portion 26a bent at right angles to the needle. Full scale deflection of the needle is determined by abutment posts 27, 28 formed integral with or secured in the plastic body 16.

One end of the moving coil 22 is grounded by way of spiral hair spring 31a to the frame 23, to which conductor 29 is soldered at 30. The other end of the coil is electrically connected to hair-spring 31b, the free outer end of which is secured to a clip member 32 slidably adjustable on the flux ring 21, and electrically connected through the flux ring to conductor 33, as will be apparent from consideration of Figs. 4 and 5. Adjustment of static balance of the moving coil and needle assembly is provided by a slidable counterbalance in the form of a coil spring 34 disposed in frictional engagement with the lower end of needle 26.

The connection of the leads 29, 33 to the photocells is effected by a pair of U-shaped clips 35 and 36, the shape of which is indicated in Fig. 8. These clips are identical and include a U-shaped body portion 36a each leg of which has an extreme end portion bent over as shown at 36b, 36c. End portion 36b is in electrical contact with a conductive terminal portion 36d of the collector strip network of photocell 18b. In this connection, it will be seen in Fig. 2 that the red color filter is cut away as shown at 18j in order to permit direct contact of clip portion 36b with the photocell collector terminal. On the other hand, the clip end portion 36c is insulated from photocell 18a by the extreme end portion 18g of the blue filter (Fig. 8). To make contact between the clip 36 and the conductive back-plate 18c of photocell 18a, one leg of the clip has secured thereto an L-shaped bracket 36e. The projecting portion of bracket 36e is disposed in a suitable recess 16a in the plastic body member and frictionally engages the back surface of the conductive back plate 18c. Thus it will be seen that each clip 36 connects the positive terminal on the top surface of one photocell in series with the negative terminal on the back-plate of the other cell.

The electrical conductors 29, 33 (Fig. 4) are soldered to terminal connector pins 29a, 33b, respectively. These pins resiliently engage the "eye" of the respective U-clips 35 and 36. It will be appreciated that, in assembly, the clips 35 and 36 are assembled in a radial direction into the diametrically spaced notches provided in the circumference of the photocell unit, after which the photocell with the clips assembled is moved axially into the recess defined by cylinder portion 17 of the housing 16, so that the eyes of the clips project from the opposite side of housing 16 in order that connector pins 29a, 33b can be sprung into place, as shown in Fig. 4, by a slight pressure on the clip end portions 36b, 36c. When this pressure is released, the eye of the clip resiliently engages the contact pin 33b, the arm 36e resiliently engages the back-plate 18c, and the clip end portion 36b is resiliently biased against the collector strip terminal 36d. Thus all circuit connections are readily made with a minimum of soldering operations required. At the same time disassembly of the instrument for repair or other servicing is facilitated.

The zero reading or "null" position of the indicator needle 26 is provided by a fiducial pointer 37 formed integral with a transversely sliding plate member 38 supported on two machine screws 39, 40 in a manner which will be obvious from Figs. 4 and 5. Plate 38 defines two parallel slots 39a, 40a through which the screws 39, 40 are disposed so that plate 38 is free to slide transversely for adjustment of the position of null pointer 37. In this connection, it should be noted that, in assembly, the screws 39, 40 are not tightened down, but are left sufficiently free to permit this transverse adjustment of plate 38. The plate is retained in adjusted position, and the adjustment thereof altered by a "zero set" screw having an eccentric projecting finger engaging a slot 41, as described more particularly hereinafter.

The indicator needle portion 26a and its relation to the fiducial pointer 37 is observed through a transparent window member 42, which may be of glass or suitable transparent plastic material. As will be apparent from Fig. 4, window 42 is received in cooperating grooves defined in the housing 16. To prevent rattling, the window is resiliently supported by a pair of curved leaf-springs 42a, 42b disposed in suitable recesses formed in the housing 16.

The construction of the front or dome assembly 12 may be seen by a comparison of Figs. 2 and 5. The dome itself is shown at 43 and is made of any suitable translucent light-diffusing material, such as an "opal" grade of the plastic known to the trade as "Lucite." It will be seen that dome 43 is provided with a depending circumferential rim portion 43a having formed therein gear teeth 44. This toothed rim portion of the dome defines a narrow annular upper surface 43b engaged by molded plastic end retainer pieces 45, 46. The central portion of dome 43 defines a first cylindrical recess 47 adapted to receive a tubular metal bushing 48 having an end flange portion 48a. The bore of this bushing is adapted to receive the enlarged head end portion 19a of the post 19. Thus centerpost 19 serves to rotatably support the dome coaxial with the photocells. The flanged bushing 48 may be secured in the dome by a light press fit, and serves as a retainer for the adjustable calibrating mask disk 49, the function of which is noted more particularly hereinafter.

It will be observed that each plastic retainer end piece 45, 46 is provided with a transverse recess as shown at 46a, the function of which is to receive a resilient tubular cushion and dust seal member shown at 50 in Fig. 5. This cushion may be in the form of a rubber or similar synthetic tube adapted to be compressed against the edge of window 42 when the sub-combinations are assembled. This further prevents the window 42 from rattling, prevents excessive stresses being applied to the window by the assembly screws, and helps to take up clearance spaces between the window and housing portions so that entry of dust is prevented.

As will be seen in Figs. 2 and 3, the end retainer cap members 45, 46 may be inscribed with a scale from which equivalent color temperature may be read. This scale is preferably divided into two portions, that on cap 45 being the low end of the color temperature scale ordinarily encountered by photographers, corresponding to the color temperature range of incandescent illumination. The other end cap 46 carries the high end of the scale, corresponding to equivalent color temperatures ordinarily encountered with natural outdoor illumination. Two circumferentially spaced fiducial spots 43c, 43d are inscribed on the dome for cooperation with the respective indoor and outdoor color temperature scales. As will be apparent in Fig. 2, the spot 43c falls opposite the 4500° Kelvin mark on the upper scale when the other spot 43d is opposite the 4500° mark on the lower scale. In other words, spot 43c leaves the indoor illumination scale just as the spot 43d begins to track the outdoor illumination scale.

The metal intermediate plate 14 serves as the "chassis" for the front dome assembly. To this end, plate 14 is provided with four holes 14a, adapted to receive four small attachment screws 14b which project into tapped holes in the plastic end cap members 45, 46, in a manner which will be obvious to those skilled in the art. From Fig. 5 it will be apparent that the bottom annular surface of dome rim 43a seats on a circumferential portion of plate 14 surrounding the large central recess 14c, the diameter of this recess being such that plate 14 fits snugly over the cylindrical projection 17 of plastic meter case 16. Thus it will be apparent that, with the end caps 45, 46 secured to plate 14 by the screws 14b, the dome 43 is rotatably retained between the end caps and the plate.

It will also be observed that the metal plate 14 is provided with an elongated slot 14d to receive the edge of window 42. It remains to note that plate 14 has four screw holes 14e which are threaded for a purpose noted hereinafter. The purpose of the opening 14f will also be noted hereinafter.

Another important function of the intermediate plate 14 is to serve as a support for a tripod socket bushing shown at 14g in Figs. 4 and 5 and in dotted lines in Fig. 2. This tripod socket may be secured to or formed integral with the bottom edge of the frame plate 14 and is adapted to project freely into a recess in the plastic body 16, as shown at 16b in Figs. 2 and 5. This threaded socket provides means for securing the meter on a tripod or similar support, or for attaching the meter to the threaded fitting of a neck or wrist strap.

The multiple masking means associated with the dome and photocells comprise the following.

Rotatably disposed on the center-post 19 are a pair of auxiliary masking disks 51, 52 (Figs. 2 and 5). These are of transparent plastic sheet material, with central openings 51a, 52a to fit the center post, and each has a radially projecting circumferential portion 53, 54 with an opaque polygonal masking spot as shown at 55, 56. In calibrating the instrument, these spots are initially disposed over the respective contact clips 35, 36. In calibrating the instrument, the auxiliary masks are shifted so that the opaque spots 55, 56 cover a desired area of the end portions of the blue and red cells respectively. When the proper calibration is obtained, these auxiliary disks are fixed to the photocell by one or more spots of transparent plastic cement applied under the edge of the auxiliary masks. Thus in normal operation, disks 51, 52 are fixed relative to the photocell.

The other major components of the masking system are shown in Figs. 2a and 2b. Fig. 2a is a plan view of the masking disk 49 which is rotatably disposed on the tubular bushing 48 as described above (Fig. 5). The fourth masking element comprises a pattern of opaque spots formed on the under surface of dome 43, as for instance by spraying black paint through a suitable stencil. The shape of these masking spots is shown in Fig. 2b. It will be observed that the pattern of opaque spots 49a painted on disk 49 are complementary to the spots 49b painted on the adjacent surface of dome 43. In one adjusted position of masking disk 49 relative to the dome, the spots 49a, 49b substantially coincide so that a maximum area of the photocells is exposed to the light passing through the dome. At the other extreme of the range of adjustment of disk 49, the spots 49a, 49b complement each other so as to define an opaque spiral mask substantially similar in shape and size to one of the spiral photocells. In the calibration of the instrument, the mask disk 49 is adjusted relative to the dome 43 until desired calibration is achieved, after which the disk is secured to the dome by one or more spots of transparent plastic cement inserted under the edge of the disk. Thus in normal operation the masking disk 49 rotates with the dome 43.

This multiple masking arrangement, and the way in which the several masks are adjusted to effect proper calibration of the instrument during manufacture, is disclosed completely in the above-mentioned copending application of Clement F. Taylor, Serial Number 275,414, and need not be described fully herein. However, it may be noted that, after calibration, the general principle of operation is that rotation of the dome 43 causes the complementary masking spots 49a, 49b to progressively uncover an increasing area of one photocell while at the same time covering a corresponding area of the other cell. Thus the ratio between the effective areas of the two cells is altered as a function of rotational displacement of the dome 43, which therefore has the same effect as transverse shifting of the opaque mask 5 in the diagrammatic representation of Fig. 1. The novel spiral configuration of the photocells and the related masks insures that the instrument will be insensitive to direction from which the illumination falls on the dome 43. In this connection it is important to note that the opal dome 43 serves as an effective light diffusing member, and that it is spaced an appreciable distance, on the order of ⅛" or more, from the surface of the photocells. The diffusing action of the dome, taken in connection with the appreciable spacing of the dome from the photocells, further tends to render the instrument insensitive to angle of incidence of the illumination.

The means for interpreting rotational displacement of the dome 43 in terms of color temperature and indicating the desired filter information are carried by the back-plate assembly 13, a rear elevation view of which is shown in Fig. 6. Thus sub-assembly comprises a plastic molding 57 to which is rotatably secured a metal calculator dial 58. As seen in the sectional view of Fig. 5, dial 58 is secured to the outer end portion of a bushing member 59 which has a stepped portion 60 rotatably journalled in the plastic back plate 57. The inner end portion of bushing 59 is secured to a large gear 61. Both dial 58 and gear 61 are preferably secured to the bushing 59 by suitable staking operations. A disked spring washer 61a is interposed between gear 61 and the backplate to prevent looseness and provide the degree of friction required to resist accidental rotation of the calculator parts. The function of gear 61 is to cause the calculator dial 58 to rotate in synchronism with the dome 43. To this end a pinion member 62 is disposed through the hole 16c formed in the molded plastic body 16, as is most clearly shown in Fig. 9. At its left-hand end, pinion 62 has formed integrally therewith a small gear 63 meshing with the calculator dial gear 61. The opposite end portion of pinion 62 is of the same diameter as the intermediate portion, so the pinion can be assembled from the left into the recess 16c as seen in Fig. 9. The extreme right-hand end portion of the pinion has molded therein gear teeth as shown at 64. These mesh with the circumferential gear teeth 44 of dome 43, as will be apparent from a consideration of Figs. 2 and 9.

It will be seen in Figs. 2, 4 and 9 that the pinion 62 is of substantially smaller diameter than the recess 16c so as to fit very loosely therein. For resiliently holding the respective pinion teeth in engagement with calculator dial gear 61 and dome teeth 44 respectively, the pinion 62 is biased resiliently by a leaf spring 65. The arrangement of this spring will be clear from reference to Fig. 4. The ends of the spring seat in recesses in the molded case 16 and the intermediate portion of the spring bears resiliently against the side of pinion 62. Thus both pairs of gear teeth at the respective ends of pinion 62 are resiliently held in engagement, without backlash. At the same time, this construction requires no close manufacturing tolerances and is very easy to assemble. For the sake of quietness in operation, the pinion 62 is preferably made of a molded plastic such as that known to the trade as "nylon."

It is to be particularly noted that the pinion 62 for transmitting rotary motion of the dome to the calculator dial provides a "double reduction" effect, so that the calculator dial rotates roughly twice as far as the dome. Thus a comparatively small movement of the dome with its associated masking means produces a comparatively large travel of the calculator dial. This makes it possible to use a relatively expanded field of data on the calculator scale card so as to be large enough to be easily read. This mechanical interconnection between the dome and the calculator dial makes the instrument much faster and easier to use, since the calculator dial is automatically set by the single operation of setting the dome to the null instrument reading.

It will now be seen that the function of the opening 14f in the intermediate plate 14 is to give the pinion 64 access to the gear teeth 44 of the dome. Similarly, the recess 15a in the other intermediate plate 15 cooperates with a cylindrical recess 57a in the back plate to form the housing for the small gear 63.

As will also be seen in Fig. 2, the second intermediate plate 15 has four holes 15b aligned with the holes 14e in the intermediate plate 14, and similar holes 16d in the body 16 and holes 57b in the molded plastic back-plate 57. To hold the entire assembly together, these holes receive four long assembly screws 66 which project freely through the back-plate, intermediate plate 15, and body 16, and are threadedly received in the tapped holes 14e in the other intermediate plate. Thus the three separately fabricated sub-assemblies are firmly held together, yet are readily disassembled for inspection and repair.

The intermediate plate 15 may be provided with U-shaped strips of resilient plastic material as shown at 67 in Fig. 2. These strips seat in recesses shown at 68 in the molded back plate 57 and similar recesses 69 in the molded plastic body 16, as shown in Fig. 4. These are sealing strips to prevent the entrance of dust into the space housing the measuring instrument 20. It will also be seen in Figs. 2 and 5 that the back plate has a groove 57c adapted to receive the rearward edge of the transparent window 42.

The back-plate assembly 13 also includes the "zero set" screw, the exterior head of which is shown at 70 in Fig. 6. In normal operation this is covered by the scale card described hereinafter. The arrangement by which turning the zero set screw effects shifting of the null fiducial pointer 37 will be apparent from Fig. 5. It will be seen that the inner end of screw 70 is provided with a lock washer fitting 71 having an axially projecting eccentric finger 71a adapted to project into the slot 41 of the shiftable plate 38. A spring washer 72 is interposed between the fitting 71 and the adjacent surface of back plate 57. This spring washer introduces sufficient friction as to prevent accidental shifting of the screw 70 and the plate 38. It will be obvious that rotation of screw 70 will cause the eccentric finger 71a to adjust the plate 38 relative to the supporting screws 39, 40.

Referring now more fully to Figs. 6 and 7, it will be seen that the calculator scale card 73 slides into a shallow recess 74 formed in the upper portion of the back plate 57, the card fitting under the calculator dial 58, as seen in Fig. 5. In this connection, it is to be observed in Fig. 6 that the heads of the long assembly screws 66 extend over the edge of the calculator scale card when in assembled position so that, if the fingers of the user should brush over the free end of the scale card, it will not be bent outwardly away from the meter case. It will also be observed that the scale card is provided with an axial slot shown at 73a in Fig. 6 to receive the bushing 59, as shown in Fig. 5, and is further cut away at 73b so as to "snap over" the molded boss 75 as shown in Fig. 6. This engagement serves to retain the scale card in place.

A further important function of the boss 75 is to limit rotational displacement of the calculator dial 58 and dome 43. To this end, the window 58a in the calculator dial has at either side thereof inwardly struck depending side portions 58b, as will be seen in Figs. 5 and 6. It will be apparent from Fig. 5 that these depending portions 58b will engage the boss 75 to limit rotation of the calculator dial to something less than 360°. Since the dome 43 is positively geared to the calculator dial, this insures that the multiple mask members associated with the dome cannot accidentally be displaced 180° out of phase from their proper position.

The calculator dial also forms a small triangular projection 58c which serves as a pointer for the color temperature scale on the calculator card. Dial 58 may also carry indicia as shown at 58d, 58e for convenient identification of the data on the scale card visible through the window 58a.

To facilitate manual positioning of the calculator dial 58, a plurality of grooves or outwardly-struck finger grips are provided as shown at 58f. Thus rapid setting of the calculator dial 58 can be effected by pushing on the finger grip portions 58f, or more accurate positioning may be effected by rotating the dome by grasping the projecting dome gear teeth 44.

This scale card and calculator dial arrangement also has the very substantial advantage that the window 58a displays only that limited portion of the field of data required for a given setting of the dome. The arrangement of the data on scale card 73 provides conveniently adjacent values of color temperature, the corrective filter required for normal color balance, and the factor by which the exposure must be connected to compensate for the use of the filter. This makes it next to impossible for the user to read the wrong data from the scale card. At the same time, the selection of a filter for "colder" or "warmer" color rendition may be readily determined by manually shifting the calculator dial 58 in the direction of the respective arrows provided at 73c, 73d on the scale card.

This arrangement for the data scale card also facilitates the use of a great variety of interchangeable scale cards carrying appropriate data for whichever of the many available color films and types of compensating filters the photographer desires to use. Ordinarily the meter will be furnished with several interchangeable scale cards carrying data for the most popular color films available, in terms of the types of filters recommended by the manufacturers of those films. The front of one such card is represented in Fig. 7.

It will be seen that the scale card identifies the brand of color film and filters with which the card is to be used, and has a circular field of data including three concentric arcuate scales. The outer scale is the longest and gives equivalent color temperature, corresponding to the divided scale marked on the end caps 45, 46 (Figures 2 and 3). The intermediate arc identifies the precise color compensating filter to be used in order to get "normal" color rendition. The inner scale shows the factor by which the exposure must be increased to compensate for the light cut out by the filter. In the present instance, this exposure factor is given in the form of the fractional number of "f-stops" by which the camera diaphragm must be opened, for a given shutter speed. It will be obvious to those skilled in the photographic art that this factor could also be marked in terms of a multiplying factor by which the shutter speed should be increased for an equivalent increase in exposure at a given diaphragm stop opening. The arrows 73c, labeled "Colder Filter," and the oppositely directed companion arrow 73d, labeled "Warmer Filter," indicate the direction the dial 58 should be moved to reveal the filters required to obtain color rendition which deviates in the indicated manner from "normal." That is, if the photographer desires "colder," more bluish, tones in his picture, he will not select the filter appearing in the window 58a, but will manually rotate the calculator dial 58 in the direction indicated by the "colder filter" arrow 73c until the next adjacent filter is exhibited. Use of this filter will give slightly bluer than normal tones in the picture. Selection of a filter two spaces removed from the "normal" filter originally shown by the window, will of course produce still colder tones. Conversely, if it is desired to produce "warmer" tones, with the reds and yellows emphasized, the user will move the calculator dial clockwise in the direction of the "warmer filter" arrow 73d one or more spaces, depending on the degree of "warmth" desired.

It will be observed that Figure 7 shows the front side of the scale card, for daylight type color film. Corresponding data for "indoor" or "tungsten" type film of the same brand may be conveniently shown on the reverse side of the card (not shown).

The method of assembly and calibration of the meter may be outlined as follows.

It is assumed that the multiple spiral photocell has been fabricated as described in the above-mentioned copending application of Taylor, Briggs, and Weary, Serial Number 271,746, with the blue and red color filters cemented thereto as shown in Fig. 2. The connector clips 35, 36 are assembled in the circumferential notches in the photocell, after which the cell with the clips in place may be moved axially into the recess defined by the cylindrical case portion 17, with the eyes of the clips projecting through the recesses 16f in the housing. The null pointer plate 38 is loosely assembled with the screws 39, 40, after which the flux ring 21 may be cemented in the recess defined between the molded case portions 21a, 21b, as shown in Fig. 4 and the measuring instrument frame 23 secured to the body by screws 24. The counter-weight 34 is adjusted to properly balance the needle and moving coil assembly, and the connector clip 32 is adjusted circumferentially on the flux ring 21 so that the null position of the indicator needle will be approximately at the middle of window 42. If the user subsequently finds that the needle is not exactly aligned with the null pointer 37 when no light strikes the dome 43, he can bring the pointer into alignment with the needle by adjustment of the "zero-set" screw 70 from the exterior of the meter.

The viewing window 42 is now inserted with the springs 42a, 42b. Likewise pinion 62 is inserted in the recess 16c with leaf spring 65 to frictionally retain it. Insertion of the electrical contact pins 29a, 33b into the eyes of the respective contact clips 35, 36 completes the circuit from the photocell to the measuring instrument.

The dome assembly 12 is simply assembled by pressing in the bushing 48 to retain the adjustable mask 49 and then adding the four screws 14b which hold the end cap pieces 45, 46 to the intermediate plate 14 so as to rotatably support the dome on the plate. The resilient tubular cushion 50 is now disposed in the groove 46a of the upper end cap piece 45.

The back-plate assembly is completed as follows. The zero-set screw 70 is installed with its spring washer 72 and the end fitting 71 is added and suitably secured. The means for fastening the fitting 71 to the screw 70 may take many forms but, as shown in Figs. 2 and 5, the lower part of 71 is U-shaped and provided with a central tongue portion which projects through a transverse hole in the end of screw 70 and is bent axially as shown at 71b to prevent dislocation of the fitting.

The calculator dial 58 is separately staked to the bushing 59, after which the bushing may be disposed through the opening in the back-plate 57, the spring washer 61a added, and the gear 61 staked to the inner end of bushing 59. The dust seal strips 67 are also assembled to the intermediate plate 15.

With the three major sub-assemblies thus completed, the meter may be calibrated in accordance with the procedure described completely in the above-mentioned application of Clement F. Taylor, Serial Number 275,414. Such details are not material here, and it need only be noted that, after the proper positions for the auxiliary masks 51, 52 are determined, they are firmly cemented or otherwise secured to the photocell unit 18. Likewise the adjustable masking disk 49 is properly set relative to the dome and secured by cementing. The three sub-assemblies may now be secured together by the through-screws 66. If the pointer 26a does not align with the null indicator 37, with no light falling on the dome 43, the zero-set screw 70 may be adjusted to effect perfect alignment.

The completed meter is shown in Fig. 3. It will now be observed that the intermediate metal plates 14, 15 have a decorative as well as utilitarian purpose, since they form bright polished metal "stripes" around the meter making an attractive contrast with the black plastic material of the body, end retainer caps, and back-plate. It will also be observed that the sides of the plastic body 16 are provided with corrugations 16e which are also both utilitarian and decorative. They serve the purpose of giving the user a surer grip on the comparatively small and otherwise smooth-surfaced meter. The meter is also prevented from accidentally slipping from the hand by the fact that both intermediate plates 14, 15 project slightly beyond the plastic parts, as shown in Fig. 3, thus forming a pair of projecting ribs extending entirely around the meter to further help give the fingers a better grip. In this connection, it is to be particularly noted that the front intermediate plate 14 has curved side portions 14h which project slightly beyond the gear teeth 44 (Fig. 3). Thus if the user's fingers accidentally brush along the sides of the meter, they will ride along the rib 14h without making accidental contact with the gear teeth 44, which might otherwise disturb the dome setting. The ornamental design of the meter is specifically claimed in the copending application of Hans A. Blake, Serial Number D. 21,608, filed September 26, 1952 and assigned to the same assignee as the present invention.

It will be observed that the meter has been carefully arranged for convenient one-hand operation, with the meter lying in the palm of the user's hand with the window 42 facing the operator and the thumb and fingers engaging the dome teeth 44. After the needle 26 is set to the null pointer 37, the meter is readily turned over in the hand to read the scale indicia visible through window 58a. For more rapid two-hand operation, the meter may be held in one hand with the fingers engaging the ribbed sides of the case so that the calculator dial 58 can be turned with the fingers of the other hand engaging the finger grips 58f.

Thus it will be seen that the invention provides an improved equivalent color temperature meter which effectively meets the many requirements of the color photographer or illuminating engineer. The design of the multiple photocell unit insures linearity of response and freedom from error due to changes in the intensity of the illumination and the direction from which the light falls on the sensitive cells. The meter is small and convenient to carry, easy to operate with either one or two hands, and automatically gives a desired scale indication by manual setting of only one element. Because of the movement-multiplying gear between the dome and calculator dial, the meter is convenient to set and easy to read. The provision of interchangeable scale cards for various film filter combinations makes the meter readily adaptable to any new color film which comes on the market, and also makes the meter readily adaptable to other color measuring and comparing uses in the illuminating engineering field. At the same time, the division of the meter into three major sub-combinations each of which can be assembled separately, renders the instrument comparatively simple to manufacture and assemble in spite of the comparatively complex calibration process required.

Those skilled in the art will appreciate that many modifications and substitutions of equivalents may be made without departing from the spirit of the invention.

For instance, the calculator dial and scale card on the backplate of the instrument may be disregarded or omitted entirely and the color temperature scales on the front end caps 45, 46 used to read color temperature directly. Other scale cards peculiarly suited for the needs of the illuminating engineer may be substituted for the photographic scale cards illustrated in Figures 6, 7. Because the backplate is readily interchangeable, specially designed backplate assemblies adapted to suit the peculiar needs of other users may be supplied.

The instrument is also readily adapted to measure the ratio between components of other portions of the spectrum, simply by removing the red and blue spiral color filters from the photocell and substituting filters adapted to transmit radiation in other spaced portions of the spectrum. It will be apparent also that the color filtering action may be provided by coatings applied directly to the surface of the photocell, instead of using separate filters cut from sheet material.

It is also to be observed in the case of low volume production wherein it is found feasible to individually calibrate the scale on each instrument, that the complex multiple masking arrangement described herein may be greatly simplified, there being required only one pattern of opaque masking areas fixed to the dome, the calibrating disk 49 and auxiliary masking disks 51, 52 becoming unnecessary. However, in high volume production, it is of enormous importance that a fixed preselected scale be provided on the calculator dial, rendering necessary the calibrating masks so that the varying characteristics of the individual photocells may be matched to the fixed scale.

It is, of course, desired to cover by the appended claims all such modifications as fall within the true scope of the invention.

What we claim as new and desire to secure by Letters Patent of the United States is:

1. A color control meter for measuring color values of light, comprising a substantially thin case, the two largest faces of said case being the front and back respectively, two light-sensitive cells in fixed positions within and facing the front of said case, said cells having similar spiral shapes and being arranged in nested relation each between the convolutions of the other one of said cells responding mostly to red light and the other of said cells responding mostly to blue light, a generally translucent member covering said cells, means rotatably attaching said translucent member to the front of said case, said translucent member having opaque masking portions arranged in a generally spiral conformation corresponding substantially to the shape of one of said cells, whereby that rotational adjustment of said member progressively masks one of said cells while progressively unmasking the other of said cells, an electrical instrument within said case connected to indicate differences between the respective responses of said cells, a rotatable indicator disk on the back of said case, means connecting said translucent member and said indicator disk so that rotation of either rotates the other, and scale means cooperating with said indicator disk to display color values of the measured light.

2. A color control meter for measuring color values of light, comprising a case, two light-sensitive cells within said case said cells having similar spiral shapes and being arranged in nested relation each between the convolutions of the other, one of said cells responding mostly to red light and the other of said cells responding mostly to blue light, masking means adjustable to progressively mask one of said cells while progressively unmasking the other of said cells, said masking means being arranged in a generally spiral conformation corresponding substantially to the shape of one of said cells, an electrical instrument within said case connected to indicate differences between the respective responses of said cells, a rotatable indicator disk mounted on said case, means connecting said masking means and said indicator disk so that adjustment of either adjusts the position of the other, and a card having three concentric arcuate scales positioned beneath said indicator disk, said indicator disk having a window through which different portions selectively of each of said three scales are visible as said disk is rotated, said three scales respectively indicating color temperature values of the measured light, photographic filter types corresponding to the indicated color temperature, and photographic exposure correction factors corresponding to the indicated filter types.

3. A color control meter for measuring color values of light, comprising a substantially flat thin case, the two largest faces of said case being the front and back respectively, two light-sensitive cells in fixed positions within and facing the front of said case, said cells having similar spiral shapes and being arranged in nested relation, each between the convolutions of the other, one of said cells responding mostly to red light and the other of said cells responding mostly to blue light, a substantially circular and generally translucent member covering said cells, means rotatably attaching said translucent member to the front of said case, said translucent member having opaque masking portions arranged in a generally spiral conformation corresponding substantially to the shape of one of said cells, whereby rotational adjustment of said translucent member progressively masks one of said cells while progressively unmasking the other of said cells, an electrical instrument within said case connected to indicate differences between the respective responses of said cells, a rotatable indicator disk on the back of said case, gear means connecting said translucent member and said indicator disk so that rotation of either rotates the other, said gear means having a gear ratio such that said indicator disk rotates through an angle substantially twice as great as the angle of rotation of said translucent member, said indicator disk having a plurality of backwardly extending radial finger grips to facilitate rotation thereof, and scale means cooperating with said indicator disk to display color values of the measured light.

4. A color control meter for measuring color values of light, comprising a substantially flat case, the two largest faces of said case being the front and back respectively, two light-sensitive cells in fixed positions within and facing the front of said case said cells having similar spiral shapes and being arranged in nested relation, each between the two convolutions of the other, one of said cells responding mostly to red light and the other of said cells responding mostly to blue light, a substantially circular and generally translucent member covering said cells, means rotatably attaching said translucent member to the front of said case, said translucent member having opaque masking portions so arranged that rotational adjustment of said member progressively masks one of said cells while progressively unmasking the other of said cells, said translucent member having a plurality of gear teeth about its circumference, an electrical instrument within said case connected to indicate differences between the respective responses of said cells, a rotatable indicator disk on the back of said case, a gear within said case mechanically connected to said indicator disk, a pinion having gear teeth at each of its ends, the teeth at one end of said pinion engaging the teeth of said translucent member and the teeth at the other end of said pinion engaging said gear, and scale means cooperating with said indicator disk to display color values of the measured light.

5. A color control meter for measuring color values of light, comprising a substantially flat thin central case portion, the two largest faces of said central case portion being the front and back thereof respectively, two light-sensitive cells mounted in fixed positions on the front of said central case portion, said cells having similar spiral shapes and being arranged in nested relation, each between the convolutions of the other, one of said cells responding mostly to red light and the other of said cells responding mostly to blue light, a flat plate over the front of said central case portion, said plate having a circular central aperture accommodating said cells, two front case portions respectively attached to opposite ends of said plate and defining a substantially circular space therebetween, a generally translucent dome within said circular space and covering said cells, said dome having a circular front portion and a backwardly extending substantially cylindrical rim portion, the back of said rim portion resting against said plate, said rim portion having a plurality of outwardly extending gear teeth about its circumference, said front case portions each having a flange extending in front of said gear teeth whereby said dome is rotatably secured to said plate, a forward-extending post attached to said central case portion and centrally located relative to said cells, said dome having a central recess receiving said post whereby said dome is maintained in coaxial relation with said cells, the circular portion of said dome having opaque masking portions arranged in a generally spiral conformation corresponding substantially to the shape of one of said cells, whereby rotational adjustment of said dome progressively masks one of said cells while progressively unmasking the other of said cells, an electric instrument within said case connected to indicate differences between the respective responses of said cells, a back case portion attached to and covering the back of said central case portion, a rotatable indicator disk mounted on said back case portion, means connecting said translucent dome and said indicator disk so that rotation of either rotates the other, and scale means cooperating with said indicator disk to display color values of the measured light.

6. A color control meter for measuring color values of light, comprising a substantially flat thin central case portion, the two largest faces of said central case portion being the front and back thereof respectively, two light-sensitive cells mounted in fixed positions on the front of said central case portion, said cells having similar spiral shapes and being arranged in nested relation, each between the convolutions of the other, one of said cells responding mostly to red light and the other of said cells responding mostly to blue light, a flat plate over the front of said central case portion, said plate having a circular central aperture accommodating said cells, two front case portions respectively attached to opposite ends of said plate and defining a substantially circular space therebetween, a generally translucent dome within said circular space and covering said cells, said dome having a circular front portion and a backwardly extending substantially cylindrical rim portion, the back of said rim portion resting against said plate, said rim portion having a plurality of outwardly extending gear teeth about its circumference, said front case portions each having a flange extending in front of said gear teeth whereby said dome is rotatably secured to said plate, a forward-extending post attached to said central case portion and centrally located relative to said cells, said dome having a central recess receiving said post whereby said dome is maintained in coaxial relation with said cells, the circular portion of said dome having opaque masking portions arranged in a generally spiral conformation corresponding substantially to the shape of one of said cells, whereby rotational adjustment of said dome progressively masks one of said cells while progressively unmasking the other of said cells, an electric instrument within said case connected to indicate differences between the respective responses of said cells, a back case portion attached to and covering the back of said central case portion, a rotatable indicator disk mounted on said back case portion, a gear rotatably mounted within said back case portion coaxial with said indicator disk, an elongated pinion extending through said central case portion, said pinion engaging at one end the teeth of said dome member and at the other end the teeth of said gear whereby said dome and said indicator disk rotate together, and scale means cooperating with said indicator disk to display color values of the measured light.

7. A color control meter for measuring color values of light, comprising a substantially flat thin central case portion, the two largest faces of said central case portion being the front and back thereof respectively, two light-sensitive cells mounted in fixed positions on the front of said central case portion, said cells having similar spiral shapes and being arranged in nested relation, each between the convolutions of the other, one of said cells responding mostly to red light and the other of said cells responding mostly to blue light, a flat plate over the front of said central case portion, said plate having a circular central aperture accommodating said cells, two front case portions respectively attached to opposite ends of said plate and defining a substantially circular space therebetween, a generally translucent dome within said circular space and covering said cells, said dome having a circular front portion and a backwardly extending substantially cylindrical rim portion, the back of said rim portion resting against said plate, said rim portion having a plurality of outwardly extending gear teeth about its circumference, said front case portions each having a flange extending in front of said gear teeth whereby said dome is rotatably secured to said plate, a forward-extending post attached to said central case portion and centrally located relative to said cells, said dome having a central recess receiving said post whereby said dome is maintained in coaxial relation with said cells, the circular portion of said dome having opaque masking portions arranged in a generally spiral conformation corresponding substantially to the shape of one of said cells, whereby rotational adjustment of said dome progressively masks one of said cells while progressively unmasking the other of said cells, an electric instrument within said case connected to indicate differences between the respective responses of said cells, a back case portion attached to and covering the back of said central case portion, a rotatable indicator disk mounted on said back case portion and slightly spaced therefrom, and scale means cooperating with said indicator disk to display color values of the measured light, said scale means comprising a card having a portion thereof removably positioned underneath said disk and having scale indicia thereon, said disk having a window through which different portions of said cord are selectively visible as said disk is rotated, said card having a tab portion not covered by said disk to permit ready removal thereof.

8. A color control meter for measuring color values of light, comprising a substantially flat elongated thin central case portion, the two largest faces of said central case portion being the front and back thereof respectively, two light-sensitive cells mounted in fixed positions on the front of said central case portion, said cells having similar spiral shapes and being arranged in nested relation, each between the convolutions of the other, one of said cells responding mostly to red light and the other of said cells responding mostly to blue light, a flat plate over the front of said central case portion, said plate having a circular central aperture accommodating said cells and being wider than said central case portion whereby a pair of its edges overhang opposite edges of said central case portion, two front case portions respectively attached to opposite ends of said plate and defining a substantially circular space therebetween, a generally translucent dome within said circular space and covering said cells, said dome having a circular front portion and a backwardly extending substantially cylindrical rim portion, the back of said rim portion resting against said plate, said rim portion having a plurality of outwardly extending gear teeth about its circumference, said front case portions each having a flange extending in front of said gear teeth whereby said dome is rotatably secured to said plate, a forward-extending post attached to said central case portion and centrally located relative to said cells, said dome having a central recess receiving said post whereby said dome is maintained in coaxial relation with said cells, the circular portion of said dome having opaque masking portions arranged in a generally spiral conformation corresponding substantially to the shape of one of said cells, whereby rotational adjustment of said dome progressively masks one of said cells while progressively unmasking the other of said cells, an electric instrument within said case connected to indicate differences between the respective responses of said cells, a back case portion attached to and covering the back of said central case portion, a back plate clamped between said back case portion and said central case portion and having a pair of opposite edges overhanging both of said contiguous case portions, said central case portion having its opposite edges ribbed between said overhanging plate edges to cooperate therewith in providing gripping means for said meter, a rotatable indicator disk mounted on said back case portion, means connecting said translucent dome and said indicator disk so that rotation of either rotates the other, and scale means cooperating with said indicator disk to display color values of the measured light.

References Cited in the file of this patent

UNITED STATES PATENTS

| | | |
|---|---|---|
| 1,931,283 | Brewer | Oct. 17, 1933 |
| 2,142,657 | Sauer et al. | Jan. 3, 1939 |
| 2,213,642 | Tonnies | Sept. 3, 1940 |
| 2,353,475 | Kinnard | July 11, 1944 |
| 2,550,936 | Poirette | May 1, 1951 |
| 2,579,661 | Freund | Dec. 25, 1951 |

FOREIGN PATENTS

| | | |
|---|---|---|
| 508,802 | Great Britain | July 5, 1939 |
| 925,985 | France | Apr. 14, 1947 |
| 812,723 | Germany | Sept. 3, 1951 |